United States Patent [19]

Davidson et al.

[11] 4,223,310

[45] Sep. 16, 1980

[54] MULTI-TRANSCEIVER ANTENNA

[75] Inventors: Allen L. Davidson; Pitt W. Arnold, both of Crystal Lake; Morton Stern, Skokie, all of Ill.

[73] Assignee: Motorola, Inc., Schaumburg, Ill.

[21] Appl. No.: 947,383

[22] Filed: Oct. 2, 1978

Related U.S. Application Data

[63] Continuation of Ser. No. 801,194, May 27, 1977, abandoned.

[51] Int. Cl.$^{2}$ .......................... H04B 7/00; H01Q 3/24

[52] U.S. Cl. ................................ 343/100 CS; 370/24; 455/31; 343/854

[58] Field of Search ................. 343/100 CS, 853, 854, 343/858, 100 SA, 876; 325/55

[56] References Cited

U.S. PATENT DOCUMENTS

| | | | |
|---|---|---|---|
| 3,226,724 | 12/1965 | Brueckmann | 343/854 |
| 3,295,134 | 12/1966 | Lowe | 343/854 |

*Primary Examiner*—Eli Lieberman

*Attorney, Agent, or Firm*—James W. Gillman; James A. Scheer

[57] ABSTRACT

The inventive antenna coupling system is capable of simultaneously radiating an omnidirectional signal pattern for a plurality of transmitters as well as providing a directive pattern to a receiver.

An antenna array is coupled to the transmitters and receiver via a plurality of antenna couplers. Each coupler includes an antenna terminal, coupled to a corresponding antenna, a transmitter input terminal and a receiver output terminal. Multiple transmitters are coupled to the transmitter input terminals through a hybrid network array. The receiver is coupled to the receiver output terminal via a logic controlled antenna switch. The antenna couplers, which may be comprised of either high pass-low pass filters or circulators provide isolation between the transmit and receiver signals.

4 Claims, 3 Drawing Figures

MULTI-TRANSCEIVER ANTENNA

This is a continuation, of application Ser. No. 801,194, filed May 27, 1977, now abandoned.

BACKGROUND OF THE INVENTION

The present invention pertains to the radio communication art and, more particularly, to an antenna array coupling network.

Antenna systems wherein a single antenna structure is adapted to both transmit and receive radio frequency signals are well known in the communication art. Commonly, in applications wherein both transmit and receive operation occurs simultaneously, either duplexers or dedicated antennas or combinations thereof are used. That is, one or more antennas is dedicated to the transmit function whereas the remaining antennas perform a receive only function.

Recently, the need has arisen for an antenna coupling system which is capable of simultaneously utilizing a multi-sectored antenna array for both directive receive and omni-directional transmit functions. The basic array and its corresponding switching logic are described more fully in copending U.S. patent applications entitled "Sectored Antenna Receiving System", the first being invented by Timothy Craig and James Stimple, filed May 2, 1977 with Ser. No. 792,961, now abandoned and the second, invented by Timothy Craig, James Stimple and Paul Erickson, also filed May 2, 1977 with Ser. No. 792,963, now U.S. Pat. No. 4,101,836. In these systems, an antenna switch which is controlled by scan control logic sequentially couples selective antenna sectors to a receiver. The antennas are arranged in a configuration of individual sectored segments to cover a full 360° of the horizontal plane. Once a transmitter signal is detected, the system activates to further modes to thereby lock onto that sector receiving the best signals from the transmitter.

It is desirable to expand the above described system so that it may both transmit and receive over the same antenna array. If possible, the simultaneous transmission of multiple transmitters is desired. Of necessity, it is imperative that signals transmitted by the array do not adversely effect the arrays receiving and scanning operation. Thus, isolation between the transmitted and received signals must be provided.

SUMMARY OF THE INVENTION

It is an object of this invention, therefore, to provide a means for simultaneously transmitting and receiving over a multi-sectored antenna.

It is a further object of the invention to provide the above described antenna coupling system wherein excellent isolation is provided between the transmitted and received signals.

A further object of the invention is to provide the above described antenna coupling system which exhibits a directive receive radiation pattern from any of a plurality of directions, and an omnidirectional transmit pattern.

An additional object of the invention is to provide the above described coupling system which is adapted for simultaneously transmitting signals from a plurality of transmitters.

Briefly, according to the invention, the transmit/receive antenna system includes an antenna array having a plurality of sectors, with each sector being arranged in a predetermined configuration. A transmitter, or transmitters are provided for producing signals to be radiated over these antenna sectors. A receiver is adapted for receiving signals over the antenna sectors. A plurality of antenna coupler means couple the receiver and the transmitter to the antenna. Each antenna coupler includes a transmitter input terminal, a receiver output terminal and an antenna terminal. Included within the antenna couplers are means to couple signals at the transmitter input terminal to the antenna terminal and to couple signals from the antenna terminal to the receiver output terminal with isolation being provided between the transmitter input terminal and the receiver output terminal. The antenna terminal from each coupler is coupled via suitable means to a predetermined one of the antenna sectors. A transmitter coupler, which in the case of multiple transmitters includes a hybrid network array, couples the transmitter signals to the antenna coupler transmitter input terminals. Finally, a receiver is provided which couples the receiver to predetermined antenna coupler receiver output terminals such that the receive radiation pattern of the antenna array extends predominately in a predetermined direction.

Preferably, the antenna coupler isolation circuitry is comprised either of high pass/low pass filters or circulators.

DETAILED DESCRIPTION OF THE PREFERRED EMBODIMENT OF THE INVENTION

Figure 1:
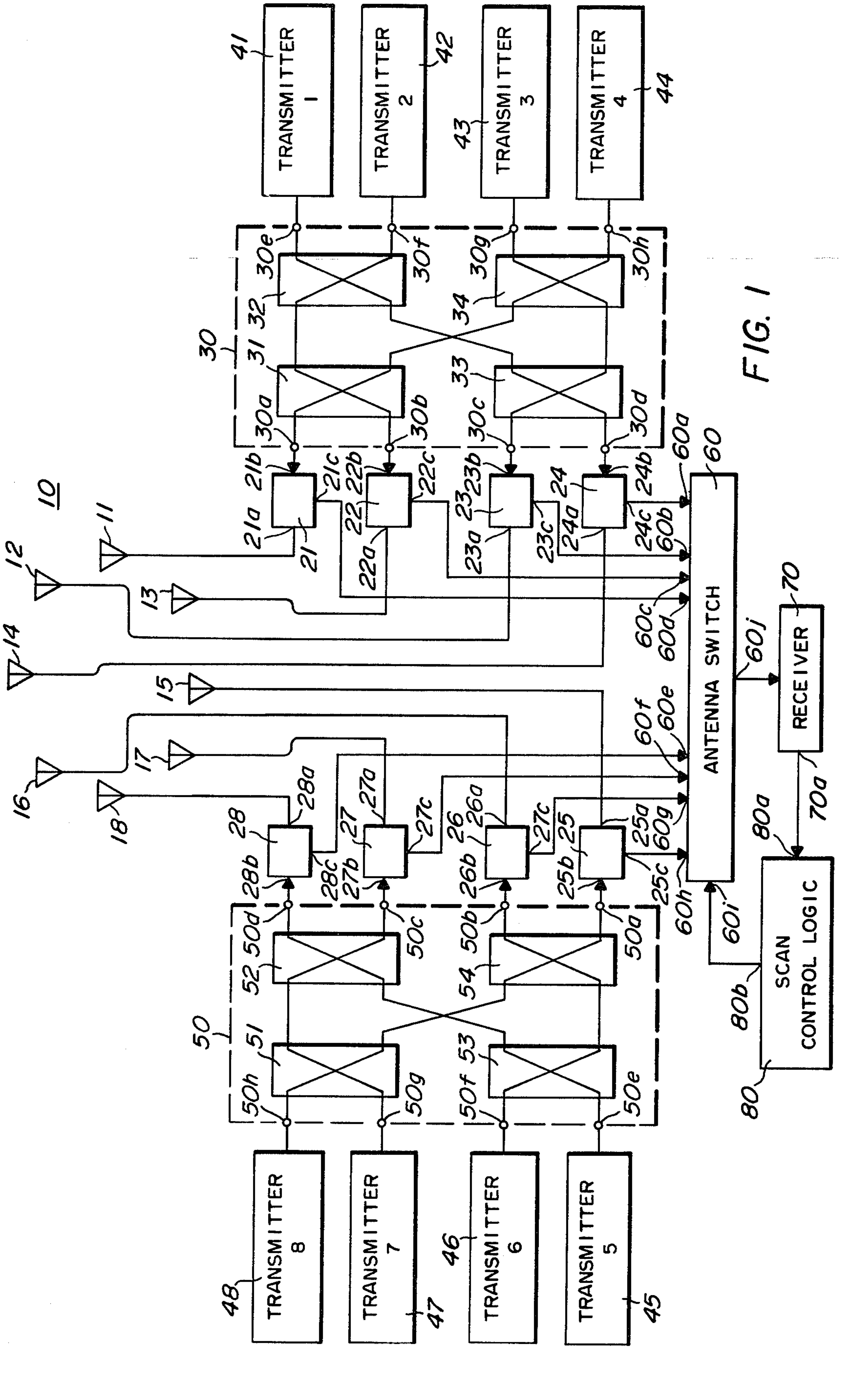
FIG. 1 illustrates the preferred embodiment of the multi-transceiver antenna coupling system.

Referring to the figure, an antenna array 10, comprising eight antenna sectors 11–18, is illustrated as forming a circular array. It is contemplated that the array 10 might be mounted atop a building or other suitable structure. Each sector in the array 10 exhibits a radiation pattern that is directive in nature. The sectors are arranged in a predetermined configuration such that the array 10 is capable of covering a full 360° of the horizontal plane.

Each antenna sector 11–18 couples to the corresponding antenna terminal **21*a*–28*a* of one of the antenna couplers 21–28. Each antenna coupler 21–28 is provided with a transmitter input terminal 21*b*–28*b* and a receiver output terminal 21*c*–28*c***, respectively.

Coupled to the transmit input terminals **21*b*–24*b* of the first four antenna couplers 21–24 are the output ports 30*a–d* of a first hybrid network array 30. Hybrid network array 30 is provided with four input terminals 30*e–h* and four internal hybrid couplers 31–34. Coupled to each input terminal 30*e*–30*g* of the hybrid network array 30 are four transmitters 41–44**, respectively.

A second hybrid coupler array 50 is provided with four output terminals **50*a*–50*d*, each of which couples to a corresponding transmit input terminal 25*b*, 28*b*, respectively. The second hybrid network array 50 is coupled to four additional transmitters 45–48 via second array input terminals 50*e*–50*h*, respectively. The second hybrid network 50 is comprised of four suitably interconnected hybrids 51–54**.

The hybrid network arrays 30, 50 are more fully described in copending U.S. patent application Ser. No. 601,560, filed Aug. 4, 1975, now abandoned, invented by Alan Loy Davidson, and assigned to the same assignee as the instant invention. Basically, conventional hybrid couplers 31–34, 51–54 are interconnected in such a manner that signals appearing at input terminals 30*e*–30*g*, 50*e*–50*h* are suitably phase and amplitude combined such that the signals appearing at the output terminals 30*a*–30*d*, 50*a*–50*d*, when applied to an antenna array, cause the array to radiate each transmitted signal in a substantially omni-directional manner, without significant interference between simultaneously transmitted signals.

Thus, the hybrid network arrays 30, 50 provide a means for simultaneously applying up to eight distinct transmitter generated signals to the array 10 for simultaneous omni-directional transmission thereover.

The receive output terminal 21*c*–28*c* of each antenna coupler 21–28 is coupled to a predetermined input 60*a*–60*h* of an antenna switch 60. The antenna switch 60 includes a switch array which responds to a control signal at its control input 60*i* to couple a selected input 60*a*–60*h* signal to the antenna switch output terminal 60*j*.

A receiver 70, of conventional design, couples to the antenna switch output terminal 60*j*. A provided receiver output terminal 70*a* is coupled to the input terminal 80*a* of a scan control logic circuitry 80. In response to the signal level of signals at its input terminal 80*a* the scan control logic 80 produces a suitable output control signal at its control output 80*b*. While a complete description of the operation of the antenna switch 60, receiver 70 and a scan control logic 80 is given in the above referenced multi-sectored antenna copending U.S. applications, it may briefly be stated that in response to the level of signals received by receiver 70 over the antenna sectors as provided through the antenna switch 60, the scan control logic operates in any one of several modes to ultimately lock onto that antenna sector which receives the best signal from a recognized remotely located transmitter site. Since the system then locks onto an individual directive sector, the system exhibits superior signal to noise performance over other antenna systems, such as of the omni-directional type.

Figure 2:
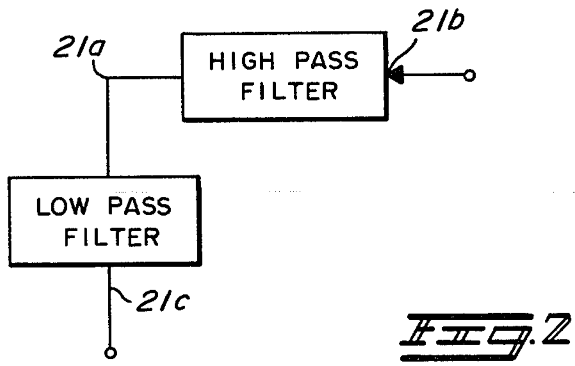
FIG. 2 illustrates a high and lowpass filter embodiment of the couplers shown in FIG. 1.

Since it is desired to both transmit and receive signals over the antenna array 10 simultaneously, it is imperative that the antenna couplers 21–28 provide isolation between the transmitted signals at the transmitter input terminals 21*b*–28*b* and the received signals appearing at the receiver output terminals 21*c*–28*c*. Thus, it is contemplated that the antenna couplers 21–28 may be fabricated in one of two ways. Firstly, for applications wherein transmission occurs at one frequency and receiving occurs at a second frequency each coupler 21–28 may be provided with suitable pass/stop filters. For example, for a situation wherein the transmit frequency is selected to be higher than that of the received frequency, a high pass filter could be connected between the transmitter input terminals 21*b*–28*b* and the antenna terminal 21*a*–28*a* and a suitably designed low pass filter could then be provided between the receiver output terminal 21*c*–28*c* and the antenna terminal 21*a*–28*a*. In this manner, signal isolation could be maintained between the transmitted signals and the received signals FIG. 2 illustrates this embodiment of coupler 21.

Figure 3:
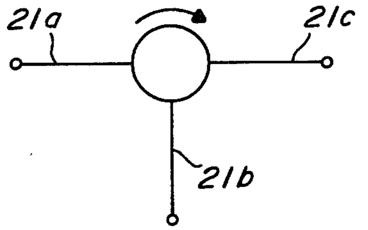
FIG. 3 illustrates a circulator embodiment of the coupler shown in FIG. 1.

In an alternate embodiment of the antenna couplers 21–28, radio frequency circulators could be employed. In this case, the circulator would be provided with three ports, each port corresponding to the transmitter input terminal, the antenna terminal, and the receiver output terminal. A conventional circulator functions to couple a signal applied at its first terminal only to its second terminal, and to couple a signal applied at its second terminal only to its third terminal. Thus, each transmitter signal would be coupled only to the antenna terminal, and each array received signal would be coupled only from the antenna terminal to the receiver output terminal. Hence, the requisite isolation is provided. FIG. 3 illustrates this embodiment of coupler 21.

Whether the high pass/low pass filter embodiment or the circulator embodiment of the antenna couplers 21–28 is used, it can be seen that the above described antenna array allows simultaneous omni-directional transmission of any one of a plurality of transmitters with simultaneous directive reception over the same antenna array.

While a preferred embodiment of the invention has been described in detail, it should be understood that many modifications and variations thereto are possible, all of which fall within the true spirit and scope of the invention.

For example, it should be understood that the inventive coupling system is not limited to an eight sector array. In general, the system will work for any multiple of four. Thus, it is contemplated that a given system might include 4N sectors, with N being any integer. Where the 4N sectors are arranged to cover a horizontal plane, the beam width of each would then be 360°/4N.

We claim:

1. An antenna system adapted for simultaneous transmit and receive operation comprising:

an antenna array having a plurality of sectors, the sectors being arranged in a predetermined configuration;

transmitter means for producing signals to be radiated over said antenna sectors;

receiver means adapted for receiving signals over said antenna sectors;

a plurality of antenna coupler means, each antenna coupler having a transmitter input terminal, a receiver output terminal and an antenna terminal, the antenna coupler means including means to couple signals at the transmitter input terminal to the antenna terminal and to couple signals from the antenna terminal to the receiver output terminal, said means providing signal isolation between the transmitter input and receiver output terminals;

means for coupling each antenna coupler antenna terminal to one of said antenna sectors;

transmitter coupler means for coupling said transmitter means to predetermined antenna coupler transmitter input terminals; and receiver coupler means for coupling said receiver means to predetermined antenna coupler receiver output terminals such that the receive radiation pattern of the antenna array extends predominately in a predetermined direction.

2. The transmit/receive antenna system of claim 1 wherein the transmitter means operates at a first frequency and the receive means operates at a second frequency and wherein each antenna coupler includes a first filter, having a pass characteristic at said first frequency and a stop characteristic at said second frequency, coupled between the transmit input terminal and the antenna terminal and a second filter, having a pass characteristic at said second frequency and a stop characteristic at said first frequency, coupled between the receive output terminal and the antenna terminal.

3. The transmit/receive antenna system of claim 1 wherein each antenna coupler is comprised of a circulator.

4. The transmit/receive antenna system of claim 1 wherein the transmitter means comprises a plurality of transmitters and wherein the transmitter coupler means comprises a hybrid coupler network having a plurality of input ports and a plurality of output ports, said hybrid coupler network including means for predeterminedly phase and amplitude combining signals applied to said input terminals and producing said phase and amplitude combined signals at predetermined output terminals, each input port adapted to be coupled to one of said transmitters and each output port coupled to a predetermined one of the antenna coupler transmitter input terminals such that the transmit radiation pattern, for each transmitter, of the antenna array is substantially omni-directional.

* * * * *